(12) United States Patent
Urresty et al.

(10) Patent No.: US 12,104,582 B2
(45) Date of Patent: Oct. 1, 2024

(54) ARMATURE FOR A WIND TURBINE GENERATOR AND RELATED METHODS

(71) Applicant: General Electric Renovables Espana, S.L., Barcelona (ES)

(72) Inventors: Julio Cesar Urresty, Barcelona (ES); Javier Luque Clavijo, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 240 days.

(21) Appl. No.: 17/550,398

(22) Filed: Dec. 14, 2021

(65) Prior Publication Data

US 2022/0186712 A1    Jun. 16, 2022

(30) Foreign Application Priority Data

Dec. 15, 2020 (EP) ..................... 20383091

(51) Int. Cl.
| | | |
|---|---|---|
| F03D 9/25 | (2016.01) | |
| F03D 80/80 | (2016.01) | |
| H02K 3/28 | (2006.01) | |
| H02K 7/18 | (2006.01) | |

(52) U.S. Cl.
CPC ............. *F03D 9/25* (2016.05); *F03D 80/82* (2016.05); *H02K 3/28* (2013.01); *H02K 7/1838* (2013.01); *F05B 2220/706* (2013.01)

(58) Field of Classification Search
CPC ........ H02K 3/28; H02K 15/125; H02P 25/18; F03D 80/60; F05B 2260/221
USPC ..................................................... 290/44, 55
See application file for complete search history.

(56) References Cited

U.S. PATENT DOCUMENTS

| | | | | |
|---|---|---|---|---|
| 8,736,133 B1 * | 5/2014 | Smith | ................... | H02K 21/24 |
| | | | | 310/208 |
| 2014/0132197 A1 * | 5/2014 | Kanazawa | ............... | H02K 3/28 |
| | | | | 310/198 |

FOREIGN PATENT DOCUMENTS

| | | | |
|---|---|---|---|
| CN | 104810997 B | 3/2017 | |
| CN | 104377911 B | 4/2017 | |
| CN | 112039302 A | 12/2020 | |
| EP | 2498381 A1 * | 9/2012 | ............... H02K 3/18 |
| EP | 3252930 A1 | 12/2017 | |
| JP | 2015084635 A * | 4/2015 | ............... H02K 3/28 |
| JP | 2017093287 A * | 5/2017 | ......... H02K 11/0094 |
| JP | 2019193352 A * | 10/2019 | ............. H02K 21/24 |
| WO | WO-2012063002 A2 * | 5/2012 | ............. H02K 19/36 |
| WO | WO-2016119511 A1 * | 8/2016 | ............. F03D 80/60 |

OTHER PUBLICATIONS

European Search Report Corresponding to EP20383091 on Jun. 4, 2021.

* cited by examiner

*Primary Examiner* — Charles Reid, Jr.
(74) *Attorney, Agent, or Firm* — Dority & Manning, P.A.

(57) ABSTRACT

The present disclosure relates to an armature for a wind turbine generator. The generator may be a permanent magnet generator. The present disclosure further relates to methods for operating such armature, generator and wind turbine. A method may include partially short-circuiting the armature windings by closing a first switch and inducing currents in the armature windings by the wind acting on the wind turbine blades.

15 Claims, 8 Drawing Sheets

ARMATURE FOR A WIND TURBINE GENERATOR AND RELATED METHODS

The present disclosure relates to an armature for an electrical machine. More particularly, the present disclosure relates to an armature for a generator of a wind turbine, e.g. a permanent magnet generator, and methods for operating such an armature, generator and wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. The rotation generates a torque that is normally transmitted through a rotor shaft to a generator, either directly or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower. The nacelle may contain and protect e.g. the gearbox (if present) and optionally the generator and, depending on the wind turbine, further components such as a power converter, and auxiliary systems.

The generator of the wind turbine may have a magnetic field generator and an armature, the magnetic field generator being configured to generate a magnetic field and the armature being configured to conduct a current induced in its windings due to the effect of the varying magnetic field in rotation.

A generator may include insulation which may help to increase the generator's reliability and service life. Insulation may e.g. provide thermal and voltage spike protection. Insulation may for example be placed between the coils of the armature of a generator.

When for any reason a wind turbine generator is stopped, the insulation of the generator may get wet or humid. For instance, during a grid outage period, the amount of humidity in the generator may not be controlled and water condensation or humidity absorption may happen, in particular if the wind turbine is an offshore wind turbine. Water condensation in the insulation may create tracking surfaces to the ground, which may cause a ground fault if the insulation is not dried before restarting the generator. Humidity absorption by the insulation may cause the insulation to delaminate due to vapor expansion, which in turn may degrade the insulation in the long term. Also, water absorption may significantly reduce the dielectric properties of the insulation. This may cause an electrical breakdown when initializing the generator again without drying the insulation.

Therefore, in order to safely restart the generator, avoiding humidity in the insulation is important. In some cases, the insulation of the generator may need to be dried first. For instance, performing a manual inspection to check whether the insulation is fit for restarting the generator is known to be done in onshore wind turbines. This is a cumbersome task, moreover a similar inspection may be rather difficult in offshore wind turbines due to accessibility limitations. In such cases, a possible way to ensure that the insulation is dry and the generator may be safely restarted, is for warm air to be blown through the armature during a certain time period. Such a period may for example be between 8 and 24 hours. This means that operation of a wind turbine may need to be delayed until heating and drying has taken place.

Another option may be to use the power converter of the wind turbine at low voltage to provide current to the windings of the generator and thus heat the insulation above the dew point due to heat losses. However, this option may only be possible if the power converter is present and fully operational, which may not be the case during installation or maintenance. In addition, it may be necessary to dry the insulation of the power converter before using it to dry the generator insulation.

SUMMARY

In an aspect of the present disclosure, a method for operating a wind turbine is provided. The wind turbine comprises a rotor including one or more wind turbine blades, and a generator including an armature. The armature comprises three or more windings and is configured to provide three or more electrical phases. A first winding is configured to provide a first electrical phase and a second winding is configured to provide a second electrical phase, the second electrical phase and the first electrical phase being out of electrical phase. The method comprises partially short-circuiting the armature windings by closing a first switch between an output wire of the first winding and an output wire of the second winding. The method further comprises inducing currents in the armature windings by the wind acting on the wind turbine blades.

In accordance with this aspect, an armature may be partially short-circuited due to the presence of at least a first switch. Thus, a generator insulation may be heated by the currents induced in the partially short-circuited armature windings due to the movement of the wind turbine blades and the corresponding rotation of the generator rotor. I.e., the generator insulation may be dried without the need to use a power converter.

In particular, a partial short-circuit, e.g. between two of the three electrical phases of the windings of the generator armature, may reduce the currents induced in the generator armature and thus reduce the torque which may be necessary to achieve for rotating the generator rotor. This may be especially advantageous for permanent magnet generators, where the magnitude of the generated magnetic field may not be varied and the currents induced in the armature may depend on the wind flowing around the wind turbine blades and its speed.

In addition, the time for heating the generator insulation may be greatly reduced in comparison to when warm air is blown by the generator cooling system. Such time may be reduced to e.g. one or two hours.

Throughout this disclosure, it may be understood that a winding is an electrical conductor, e.g. a wire, included in the generator armature. A winding may be wound forming turns, e.g. around an armature tooth. A group of turns may be referred to as a coil. In some examples, a coil may include just one turn. Thus, a winding may comprise one or more coils. For instance, a winding may comprise three coils and each coil may be wound around an armature tooth.

A winding may include an output wire. Herein it may be understood that an output wire is configured to carry currents induced in the winding away, e.g. towards a power converter, if included in the wind turbine, or directly towards the electrical grid. An output wire may be integrally formed with the corresponding winding, e.g. an end of the winding may be the output wire, or may be provided as a separate element which is connected to the winding.

A changing magnetic field, e.g. a rotating magnetic field caused by the rotation of a rotor including permanent magnets, may induce an alternating voltage (and therefore also an alternating current) in an armature winding. Throughout this disclosure, it may be understood that an electrical phase may be an alternating voltage induced in a winding. Such a voltage may have a sinusoidal waveform. Thus, if an armature has for example three windings, each winding may provide an electrical phase in presence of a varying magnetic field.

Accordingly, any reference to a winding providing an electrical phase throughout this disclosure may refer to the fact that an alternating voltage is induced in the winding (e.g. in one or more coils of the winding) by a varying magnetic field.

Two electrical phases may have an electrical phase difference between them. Herein, an electrical phase difference may be understood as an angular difference between two electrical phases. When the electrical phase difference between two electrical phases is zero, it may be said that the two electrical phases are in phase. When the electrical phase difference between two electrical phases is not zero (or a multiple of 360°; i.e. n·360° with n=1, 2, 3, . . . ), it may be said that the two electrical phases are out of phase. In a triphasic armature, i.e. an armature with three windings and each winding providing an electrical phase, an electrical phase difference between any of two of the three electrical phases may for example be 120°.

Throughout this disclosure, short-circuiting may be understood as providing an electrical connection of low resistance. For example, two windings may be short-circuited by electrically connecting them, e.g. through a wire or a switch. Thus, after the short-circuit, i.e. after creating a new electrical path, current may travel through such electrical path.

Herein, it may be understood that a switch may refer to any electrical element that is able to electrically connect or disconnect a conducting path in an electrical circuit. A switch may selective allow the current to pass between the wires that it is connected (e.g. attached) to. A switch may provide one or more electrical connections through which current may travel.

The terms "current" and "currents" may be used interchangeably throughout this disclosure.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Even though examples are particularly shown for armature modules and armatures for generators of wind turbines, the same armature modules and armatures may be used in other electrical machines and/or in other applications as well.

Figure 1:
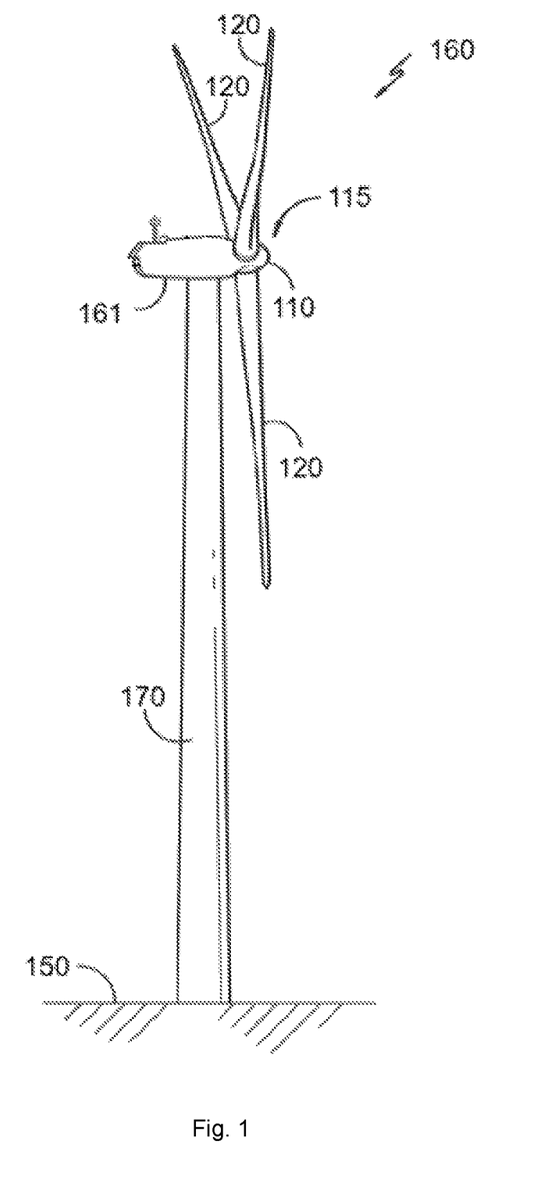
FIG. 1 illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. In some examples, the hub 110 may be rotatably coupled to an electric generator 162 (FIG. 2) positioned within the nacelle 161 to permit electrical energy to be produced.

Figure 2:
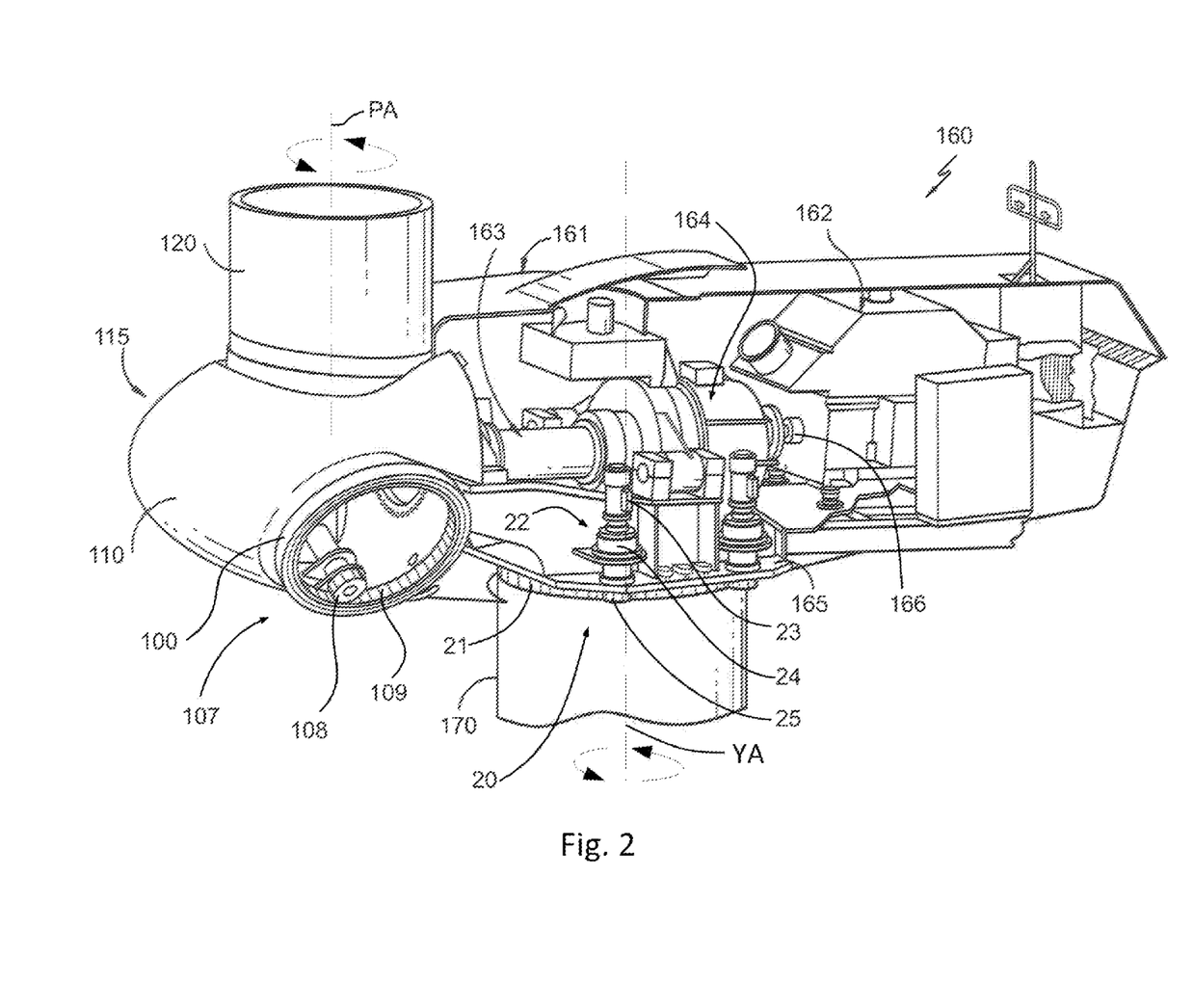
FIG. 2 illustrates a simplified, internal view of one example of the nacelle of the wind turbine of the FIG. 1.

FIG. 2 illustrates a simplified, internal view of one example of the nacelle 161 of the wind turbine 160 of FIG. 1. As shown in this example, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

In this example the rotor shaft 163, gearbox 164, and generator 162 may be supported within the nacelle 161 by a support frame or bedplate 165 positioned atop the wind turbine tower 170.

The nacelle 161 may be rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

In some other examples, the generator 162 may not be in the nacelle 161. For instance, the generator 162 may be arranged between the rotor 115 and the nacelle 161 in direct drive wind turbines.

Blades 120 are coupled to the hub 110 with a pitch bearing 100 in between the blade 120 and the hub 110. The pitch bearing 100 comprises an inner ring and an outer ring.

A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

In order to safely start a generator 162, e.g. after it has been stopped, drying the generator insulation may be necessary. Apparatus and methods suitable for this purpose are disclosed herein.

Figure 3A:
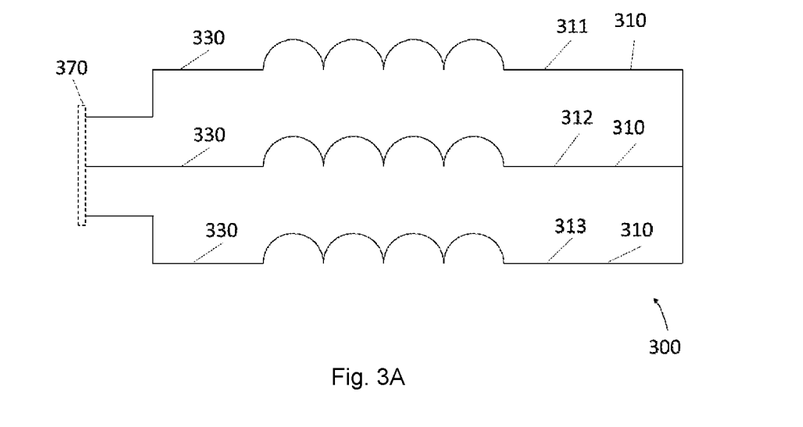
FIG. 3A schematically illustrates an example of a generator armature.

An example of an armature 300 which may be short-circuited in its entirety, i.e. by providing an electrical connection between all the armature windings, is shown in FIG. 3A. In this example, armature 300 is a three-phase armature (i.e. an armature configured to provide three electrical phases) and comprises three windings 310 connected in parallel. In other examples, the windings may be connected in series. Both these situations should be regarded as represented in FIG. 3A.

Each winding 310 has an output wire 330. Currents induced in the windings 310 may be conducted towards the power converter, if included in the wind turbine, or directly towards the electrical grid, through the output wires 330. The armature 300 is connected in a star, wye or Y configuration in this example.

Figure 3B:
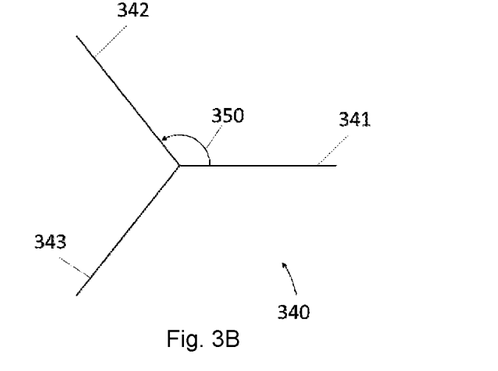
FIG. 3B schematically represents an electrical phase output that the armature of FIG. 3A may provide according to an example.

Each winding 310 may be configured to provide three or more electrical phases 340. For example, as illustrated in FIGS. 3A and 3B, a first winding 311 may be configured to provide a first electrical phase 341, a second winding 312 may be configured to provide a second electrical phase 342, and a third winding 313 may be configured to provide a third electrical phase 343. FIG. 3B schematically represents these electrical phases 340 and the electrical phase differences 350 between them.

In the example of FIG. 3B, all the electrical phases 340 have a substantially same electric phase difference 350 between them. That is to say, the electrical phase difference 350 between each pair of the electrical phases 340 is substantially the same. The electrical phase difference 350 is thus of 120° in FIG. 3B.

Figure 4:
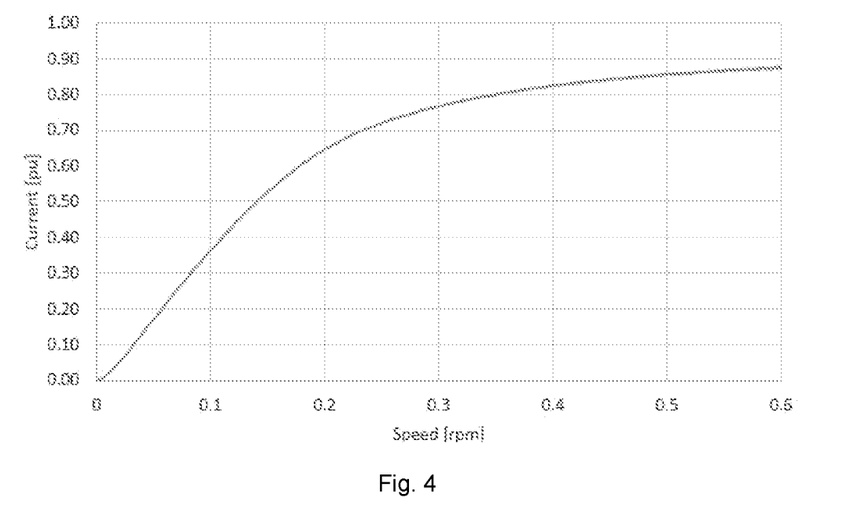
FIG. 4 illustrates an example of short-circuit current that may be induced in the armature of FIG. 3A as a function of the speed of the rotor.
Figure 5:
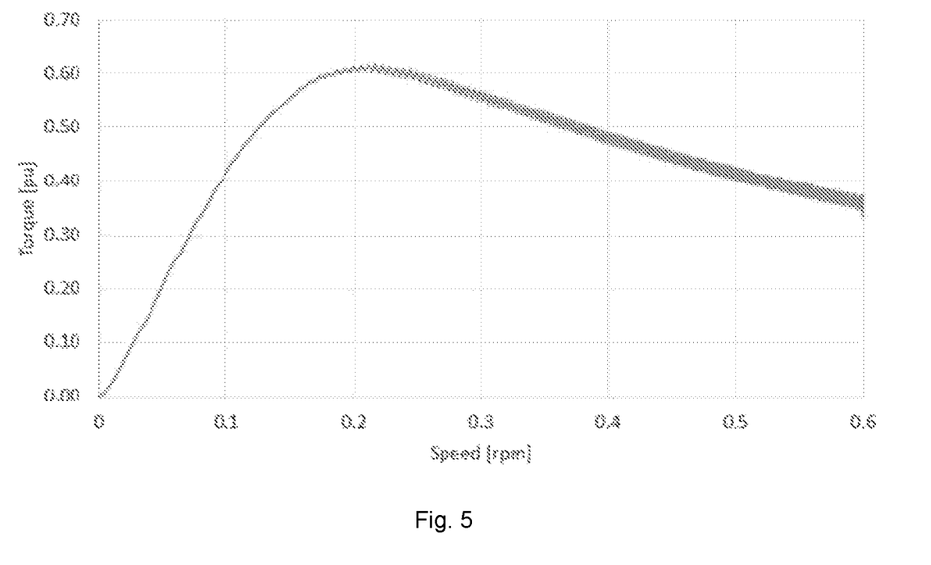
FIG. 5 illustrates an example of torque which may be necessary to attain the speeds of rotation and the induced currents of the example of FIG. 4.
Figure 6:
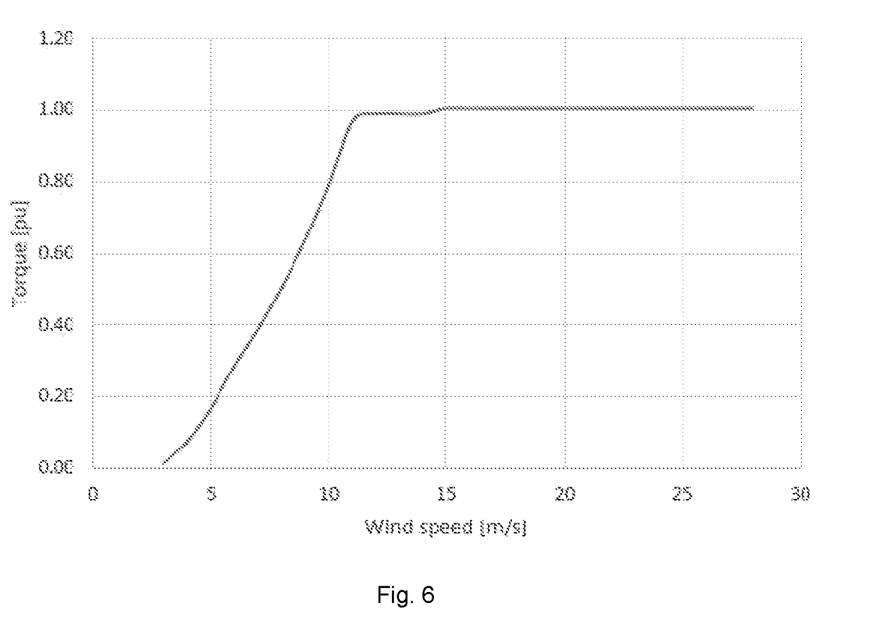
FIG. 6 illustrates an example of the wind speed that may be required to reach the torque values of FIG. 5.

In the absence of a separate drive like a converter, in order to reach a certain level of current in the armature windings 310, the generator rotor needs to be rotated at a certain speed of rotation by the action of the wind over the wind turbine blades 120. Likewise, in order to achieve a sufficient speed of rotation, exceeding a certain wind speed over a period of time is required. FIGS. 4-6 are examples that illustrate this.

FIG. 4 shows an illustrative example of the evolution of short-circuit current flowing through the armature windings 310 as a function of the speed of the rotor of a wind turbine, e.g. a wind turbine comprising a permanent magnet generator, when a three-phase armature such as the one of FIG. 3A is short-circuited in its entirety, i.e. the three output wires 330 are put into electrical contact. A total short-circuit of the windings 310 is labeled as 370 in FIG. 3. As shown in this figure, for a given magnetic field (determined by the permanent magnet configuration of the rotor), the higher the rotation speed of the rotor, the higher the induced current in the short-circuited windings may be.

Short-circuit current may refer herein to a current induced in the armature windings traveling through (at least) an electrical path provided by one or more switches 320, wherein the path would not be provided during the normal operation of the generator 162. Also, throughout this disclosure, short-circuiting may refer to providing such a connection enabling an electrical path not available before. For example, one or more electrical paths or electrical connections may be provided by closing a switch.

FIG. 5 is an illustrative example of the torque which may be necessary to attain the speeds of rotation and the induced currents of the example of FIG. 4. FIG. 5 shows that torque may rapidly increase with rotational speed and that in general high torque values, e.g. between 0.4 and 0.6 pu (per unit values regarding nominal torque as reference value), may already be reached at very low speeds of rotation of the rotor, e.g. at 0.1 or 0.2 rpm.

As shown in the example of FIG. 6, rather high wind speeds may be required to obtain the necessary torque to rotate the rotor at a sufficient speed in order to induce currents in the short-circuited armature windings 310. For example, wind speeds of 7 to 9 m/s may be needed to provide torques between 0.4 and 0.6 pu. That means that prior to starting up a wind turbine, the prevalent wind speed needs to be above this level for a sufficient period of time for inducing the currents in the stator and heating up the windings and surrounding insulation. This may mean that at a given moment, the wind turbine may not be able to safely start up, or that start-up may need to be delayed for hours, days or even weeks.

However, partially short-circuiting the armature windings 310 may induce less current in the windings 310 for a given rotational speed. Similarly, less torque, and thus less wind speed, may be necessary in order to rotate the rotor at such rotor speeds. Starting up of the wind turbine after interruption may thus require less time.

Throughout this disclosure, partially short-circuiting may refer to enabling one or more electrical paths between windings in a way that not all the armature windings are being put into electrical contact at a same time. In one example, an armature may include three windings and it may be partially short-circuited by providing an electrical connection between two of the windings.

In another example, an armature may include six windings, e.g. windings 1 to 6. One may think of the six windings as three pairs of windings, e.g. pair 1 including windings 1 and 2, pair 2 including windings 3 and 4, and pair 3 including windings 5 and 6. Such an armature may be partially short-circuited for example by providing three electrical connections, one per pair of windings, i.e. one between windings 1 and 2, one between windings 3 and 4, and one between windings 5 and 6. Therefore, all the windings may be actually short-circuited, but as not all the windings are put into electric contact as in FIG. 3A, the armature (or armature windings) may still be partially, and not entirely, short-circuited.

Figure 7:
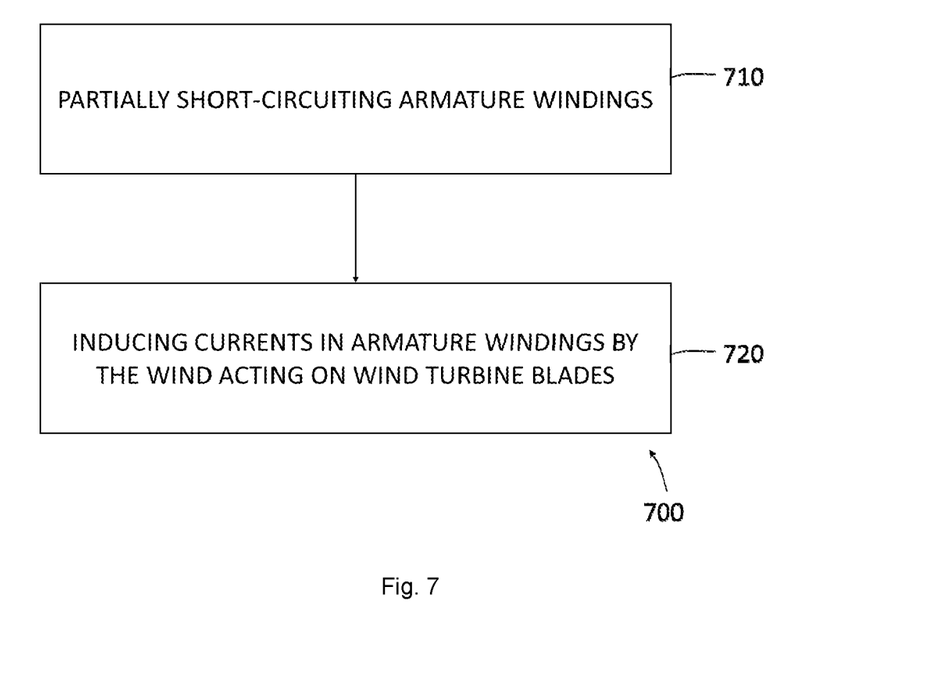
FIG. 7 shows a flowchart of a method for operating a wind turbine.

Accordingly, in an aspect of the invention, a method for operating a wind turbine 700, e.g. the wind turbine 160 of FIG. 1, may be provided. FIG. 7 shows a flow chart of such a method. The wind turbine 160 comprises a rotor 115 including one or more wind turbine blades 120, and a generator 162 including an armature 300.

The armature 300 comprises three or more windings 310 and is configured to provide three or more electrical phases 340, wherein a first winding 311 is configured to provide a first electrical phase 341 and a second winding 312 is configured to provide a second electrical phase 342, the second electrical phase 342 and the first electrical phase 341 being out of phase.

The method comprises, at block 710, partially short-circuiting the armature windings 310 by closing a first switch 321 between an output wire 331 of the first winding 311 and an output wire 332 of the second winding 312. I.e. the first switch 321 provides an electrical connection between the output wire 331 of the first winding 311 and the output wire 332 of the second winding 312. The third winding 313 includes output wire 333.

An output wire 330 may be integrally formed with the corresponding winding 310 in some examples. In other examples, the output wire 330 and the winding 310 may be provided as separate elements connected, e.g. physically connected, to each other.

Figure 8:
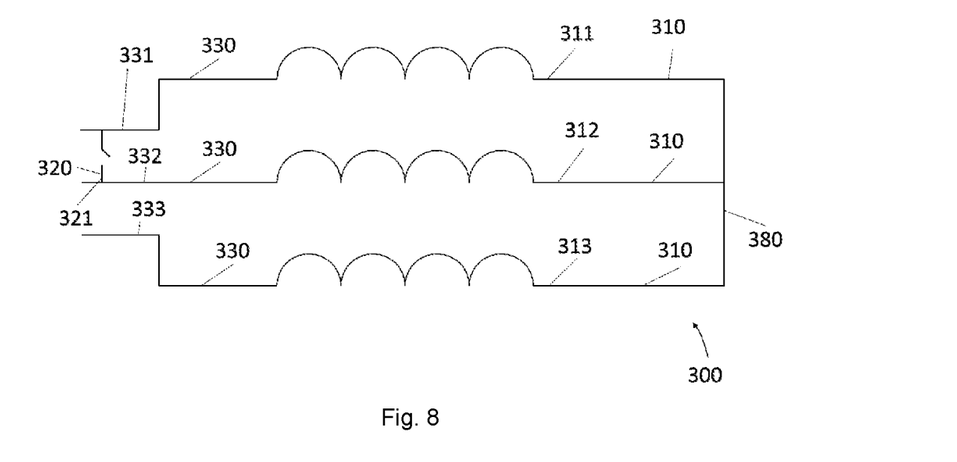
FIG. 8 schematically illustrates an example of a generator armature according to the invention.

An example of such an armature 300 may be seen in FIG. 8. The armature in FIG. 8 may correspond to the three-phase armature of FIG. 3A, but a switch 320 has been connected between output wires 331 and 332. In this figure, switch 320 may therefore enable an electrical connection between wires 331 and 332, rather enabling an electrical connection among all the three output wires 331, 332, 333 as in FIG. 3A.

A switch 320, e.g. the first switch 321, may be any electrical element suitable for allowing the current to pass between the wires that it is connected (e.g. attached) to.

The method further comprises, at block 720, inducing currents in the armature windings 310 by the wind acting on the wind turbine blades 120.

Partially short-circuiting the armature 300 in this way may facilitate drying the generator insulation in a fast and efficient way. This is due to the fact that the generator insulation may be heated without a power converter and without high wind speeds. In particular, the warming time may be reduced, e.g. in comparison to when warm air is blown to dry the insulation. In some examples, a warming period of one or two hours may suffice before starting the generator 162. As the magnetic field induced in the stator windings 310 may not be varied in a permanent magnet generator, this method may be particularly advantageous for such a generator.

Therefore, instead of entirely short-circuiting the windings 310 of the generator armature 300, such as in FIG. 3A, they may be partially short-circuited, e.g. as illustrated in FIG. 8.

In some examples, the method may further comprise providing one or more switches 320 and connecting a first switch 321 between an output wire 331 of a first armature winding 311 and an output wire 332 of a second armature winding 312.

As indicated above, the generator armature 300 may be configured to provide an electrical phase output where all the electrical phase differences 350 are substantially the same. However, in some other examples the armature 300 may be configured to provide an electrical phase difference 355 between two of the electrical phases 340 that is lower than another electrical phase difference 350 of the armature.

Figure 9:
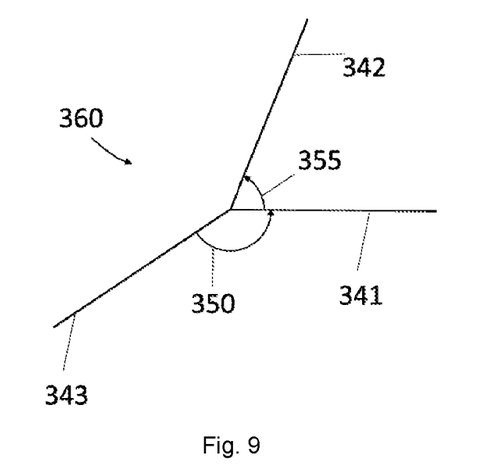
FIG. 9 schematically represents an electrical phase output that the armature of FIG. 8 may provide according to an example.

In some of these examples, and as represented in the electrical phase output 360 of FIG. 9, the armature may be configured to provide an electrical phase difference that is lower than any of the other electrical phase differences that the armature is configured to provide. As seen in this figure, two electrical phase differences between different windings are distinct. In some other examples, more than two electrical phase differences between windings may be different. The electrical phase difference 350 may be configured by adjusting a distance (in terms of azimuth angle) between the coils included in the windings 310 providing different electrical phases 340.

In some examples, the first electrical phase 341 and the second electrical phase 342 may have an electrical phase difference 355 that is lower than an electrical phase difference between any other electrical phases.

Depending on the number of electrical phases 340 and the values of the electrical phase differences 350, there may be a plurality of options for connecting output wires 330 configured to provide electrical phase differences lower than other, or any other, output wires 330.

For example, in FIG. 9 there is one clearly identified lowest electrical phase difference 355 between electrical phases 340. Herein "lowest" refers to the fact that the electrical phase difference 355 is lower than the other electrical phase differences 350. It may thus be said that in some examples the armature may be configured to provide a lowest electrical phase difference 355. This lowest electrical phase difference 355 may for instance be 80°, and the other two electrical phase differences 350 may for instance be 140°.

But in another three-phase example, one electrical phase difference may e.g. be 180° and the lowest electrical phase difference 355 may e.g. be 90°. I.e., more than one lowest electrical phase difference 355 is possible. In this example, a switch 320 may be connected between the two output wires providing any of the 90° electrical phase difference. Alternatively, a switch 320 may be connected between the three output wires 330, but at a certain time an electrical connection may be provided between one pair of wires providing the 90° electrical phase difference 355 or between the other pair of wires providing the 90° electrical phase difference 355.

Short-circuiting between windings 310 configured to provide a lowest electrical phase difference 355 may again reduce the induced currents when the rotor is rotated by the action of the wind on the wind turbine blades 120. Therefore, heating the generator insulation may be efficiently performed, especially when compared to the case whether all the output wires 330 of the generator windings 310 are short-circuited as in FIG. 3A.

In some examples, as explained further below with respect to FIG. 10A, the three or more windings 310 may be arranged in groups of windings 405, 410, e.g. of three windings. In some of these examples, each group 405, 410 may be connected to its own neutral wire 380. In some other examples, each group 405, 410 may be connected to a same neutral wire 380; i.e. only one neutral wire 380 may be present instead of a number of neutral wires 380 equal to the number of windings groups 405, 410.

In some examples where the armature may comprise two or more winding groups 405, 410 and each group includes its own neutral wire 380, the method may further comprise connecting one or more switches 320 between the neutral wires 380 of each group of windings 405, 410 such that all the neutral wires 380 may be in electrical contact. Such switches 320 may be referred to as neutral switches 322 herein in order to differentiate them from the switches that may put the output wires 330 of the windings 310 into electrical contact. In some of these examples, the armature 300 may be a six-phase armature (i.e. an armature configured to provide six electrical phases) and it may be configured such that an electrical phase difference exists that is lower than other electrical phase differences of the armature, e.g. as explained with regard to FIG. 10B.

In some examples, the method may further comprise electrically connecting 500 a plurality of pairs of output wires 330, the electrical phase differences 355 between the electrical phases 340 provided by the pairs of output wires 330 being the same. Herein, "being the same" refers to the fact that the electrical phase differences are the same as the electrical phase difference 355 which is lower than an electrical phase difference between other electrical phases. The output wires 330 of some or all the pairs of output wires 330 configured to provide an electrical phase difference 355 lower than other, e.g. any other, electrical phase difference may be electrically connected 500.

Figure 10A:
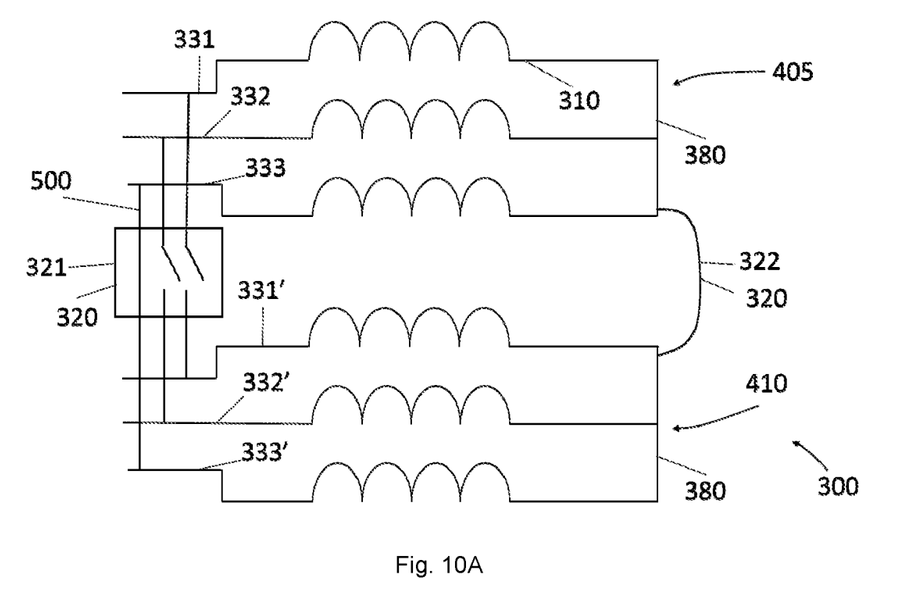
FIG. 10A schematically illustrates another example of a generator armature according to the invention.

For example, in FIG. 10A three pairs of output wires may be provided: a first pair including wires 331 and 331', a second pair including wires 332 and 332', and a third pair including wires 333 and 333'. Each of these pairs of output wires 330 may be configured to provide a lowest electrical difference 355. Thus, the output wires 330 of one or more of these pairs may be electrically connected 500 in some examples. In an example, wires 331 and 331' (or 332 and 332'; or 333 and 333') may be put into electrical contact 500. In another examples, wire 331 may be electrically connected with wire 331', wire 332 may be electrically connected with wire 332' and wire 333 may be electrically connected with wire 333'.

The method may thus include providing a number of electrical connections 500 equal to the number of the possible lowest available electrical phase differences 355 that the armature 300 is configured to provide. Enabling the later circulation of short-circuit current in this way may facilitate heating the generator insulation in a homogeneous and fast way, as current may travel in all the windings 310. Still, as the short-circuit may be partial (because not all the output wires 330 would be electrically connected among them as in FIG. 3A), the required rotor speed of rotation and wind speed acting on the wind turbine blades 120 may be reduced in comparison with an entire short-circuit situation, where e.g. all the output wires 330 may be put into electrical contact as e.g. in FIG. 3A.

In some examples, the method may comprise providing one or more electrical connections 500 at a first time and one or more electrical connections 500 at a later time. In this way, short-circuit current may be used to heat first a portion of the armature windings and then another portion of the armature windings. In some examples, a portion may be heated more than once. In an example, output wires 331 and 331', and output wires 332 and 332' may be first put into electrical contact 500 (see FIG. 10A) and short-circuit current may pass through them afterwards. Later, the electrical connection between output wires 331 and 331' may be stopped, and output wires 333 and 333' may be put into electrical contact 500 (see FIG. 10A). Therefore, short-circuit current may pass through wires 332 and 332' as well as through wires 333 and 333' afterwards.

In general, which electrical connections 500 may be performed, when, and for how long, may be adjusted. In any case, a short-circuit current may flow through the wires that have been put into electrical contact 500 and may heat the generator insulation.

In some examples, short-circuit current may be circulated through each of the three or more, i.e. all, the windings 310. For example, if the three electrical connections 500 in switch 320 are provided in FIG. 10A, a short-circuit current may flow through wires 331 and 331', through wires 332 and 332', and through wires 333 and 333' during e.g. a substantially same period of time. In some other examples, a short-circuit current may flow through wires 331 and 331' if the corresponding electrical connection 500 in the switch 320 allows current passage between these wires but not between wires 332 and 332' and between wires 333 and 333'.

In some examples, the method may further comprise circulating short-circuit current through the armature windings 310 during less than three hours, preferably less than two hours.

In some examples, the method may further comprise disabling the passage of current between the output wires 330 which have been short-circuited. In some examples, the switches 320 connected between the output wires 330 of the generator windings 310 may be deactivated, i.e. all the electrical connections that a switch 320 may be providing may be interrupted. If a neutral switch 322 is connected between the neutral wires 380 of two groups of windings 310, this neutral switch 322 may not need to be disabled before the start of the generator 162.

In some examples, the method may further comprise starting the generator 162. For instance, once a certain amount of time has elapsed since current has started to flow in the armature windings 310 including one or more switches 320, the generator 162 may be connected to the electrical grid again.

Figure 11:
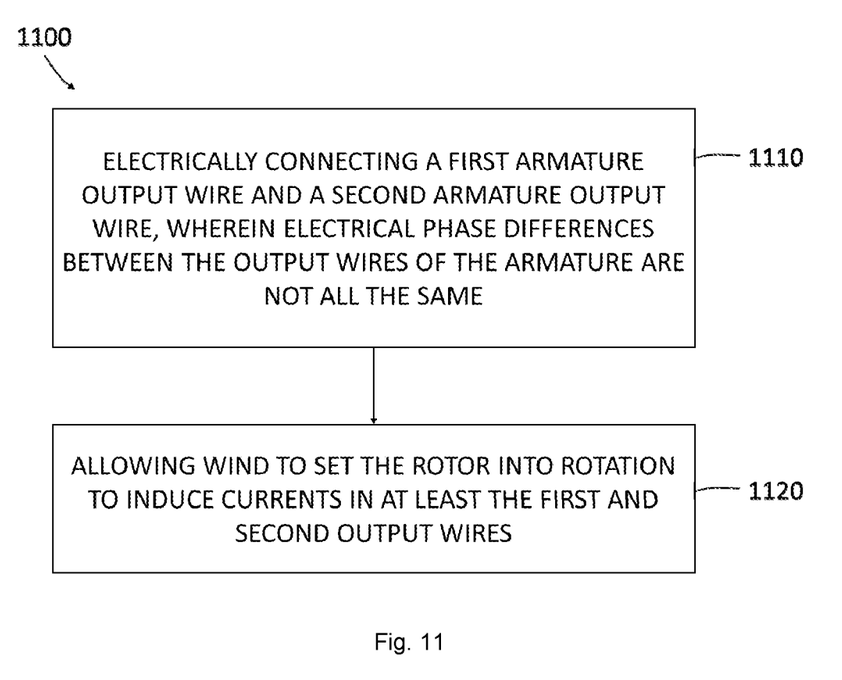
FIG. 11 shows a flowchart of a method for heating insulation of a generator of a wind turbine.

In a further aspect of the invention, a method 1100 for heating an insulation of a generator 162 of a wind turbine 160 is provided in FIG. 11. The wind turbine comprises a rotor 115 including one or more wind turbine blades 120, and a generator 162 including an armature 300.

The method comprises, at block 1110, electrically connecting a first output wire 331 of the armature 300 with a second output wire 332 of the armature 300, wherein the armature 300 comprises three or more windings 310, each winding 310 having an output wire 330, and wherein electrical phase differences 350 between the output wires of the armature are not all the same. I.e., the armature 310 is configured to provide an electrical phase difference 355 that is lower than other electrical phase differences that the armature 310 is configured to provide.

The armature 300 may for instance be the armature of FIG. 8 or FIG. 10A.

In some examples, the armature windings 310 may be connected in a star or wye configuration.

In some examples, the armature 300 may be a six-phase armature (i.e. an armature configured to provide six electrical phases) or a nine-phase armature (i.e. an armature configured to provide nine electrical phases). In some of these examples, the six windings 310 may be connected to a same neutral wire 380. In some other of these examples, the six windings 310 may be grouped in two groups 405, 410, each group 405, 410 comprising three windings 310 and being connected to its own neutral wire 380. In these examples, the method may further comprise providing an electrical connection 500, e.g. by connecting a neutral switch 322, between the neutral wires 380 of each group 405, 410 of windings 310.

In some examples, the first 331 and second 332 output wires may provide a first 341 and second 342 electrical phase (respectively), and the first 341 and second 342 electrical phases have an electrical phase difference 355 between them that is lower than an electrical phase difference 350 between other, in particular any other, electrical phases 340.

In some examples, the method may further comprise providing an electrical connection 500 between the output wires of all the pairs of output wires 330 that are configured to provide an electrical phase difference 355 lower than other, e.g. any other, electrical phase differences 350. The description with regard to FIG. 10A may apply herein.

The method comprises, at block 1120, allowing wind to set the rotor 115 in rotation to induce currents in at least the electrically connected first 331 and second 332 output wires.

In some examples, (partial) short-circuit currents may be induced in all the windings 310 of the armature 300. In some examples, short-circuit currents may be circulated in all the windings 310 of the armature 300 for a same period of time. In some of these examples, currents may be circulated for less than three hours.

The two methods 700, 1100 described herein may be combined, i.e. a method may include features from the other method. For example, the method 1100 (FIG. 11) may comprise features described with respect to the method 700 (FIG. 7). Any of these methods may be used with the armature 300 described below.

In a further aspect of the invention, an armature 300 for a generator is provided. The generator may be a wind turbine 160 generator 162 and may in particular be a permanent magnet generator. The armature 300 may be any of the armatures 300 as described with respect to FIGS. 8 and 10A.

As shown in FIG. 8, the armature 300 comprises three or more windings 310 configured to provide three or more outputs with different electrical phases 340, wherein a first winding is configured to provide a first electrical phase 341 and a second winding is configured to provide a second electrical phase 342, the first electrical phase and the second electrical phase being out of phase.

The armature 300 further comprises a first switch 321 configured to selectively (electrically) connect an output wire 331 of the first winding 311 and an output wire 332 of the second winding 312. The first switch 321, or in general any switch 320, may provide one or more electrical connections 500.

Having an armature 300 with at least one switch 320 connected in this way may enable partially short-circuiting the armature windings 310 and heating the generator insulation by rotating a generator rotor without the need of using a power converter. It may also reduce the speed that the wind may need to flow over the wind turbine blades 120.

An armature 300 may be a six-phase armature (i.e. an armature configured to provide six electrical phases) or a nine-electrical phase armature (i.e. an armature configured to provide nine electrical phases) in some examples.

As mentioned with regard to the first method above (method 700), in some examples, the armature 300 may be configured to provide an electrical phase difference 355 that is lower than other electrical phase differences of the armature. In some of these examples, the first electrical phase 341 and the second electrical phase 342 may have an electrical phase difference 355 that is lower, than an electrical phase difference 350 between other, and in particular any other, electrical phases 340. The armature 300 may be configured to provide an electrical phase difference 350 between the first electrical phase 341 and the second electrical phase 342 that is a lowest electrical phase difference 355, i.e. an electrical phase difference 355 that is lower than an electrical phase difference 350 between any other electrical phases 340.

In some of these examples, the armature 300 may comprise one or more switches 320 configured to provide electrical connections 500 between different pairs of output wires 330, wherein each electrical connection 500 is provided between pairs of output wires 330 configured to provide electrical phases 340 having a same electrical phase difference 350, i.e. an electrical phase difference 355 lower than an electrical phase difference 350 between other, e.g. any other, electrical phases 340, as explained with reference to FIG. 10A.

Also as illustrated in FIG. 8, in some examples the armature windings 310 may be connected in a star configuration. In some of these examples, such as e.g. in FIG. 8, the three or more windings 310 may be connected to a same neutral wire 380.

In some other examples, the three or more windings 310 may be arranged in groups of windings, e.g. of three windings, and each group 405, 410 may be connected to its own neutral wire 380. In some of these examples, one or more switches 320 (neutral switches 322) may be connected between the neutral wires 380 of the groups to selectively (electrically) connect the neutral wires 380.

An example in this respect may be seen in FIG. 10A. FIG. 10A schematically represents a six-phase armature 300 comprising six windings 310 arranged in two groups of three-phase windings 405, 410. Each group 405, 410 is connected to its own neutral wire 380 and a switch 320 (neutral switch 322) connects the two neutral wires 380. In some other examples, the groups of windings 310 may be connected to a same neutral wire 380 and a switch 320 (neutral switch 322) connecting the neutral wires 380 may not be required.

In FIG. 10A, a switch 320 may enable an electrical connection 500 between the outputs 330 of the windings 310. In particular, the switch 320 connecting the outputs 330 of the windings 310 may be a first switch 321. The first switch 321 may regulate which output wires 330 are put into electrical contact 500 and when.

Figure 10B:
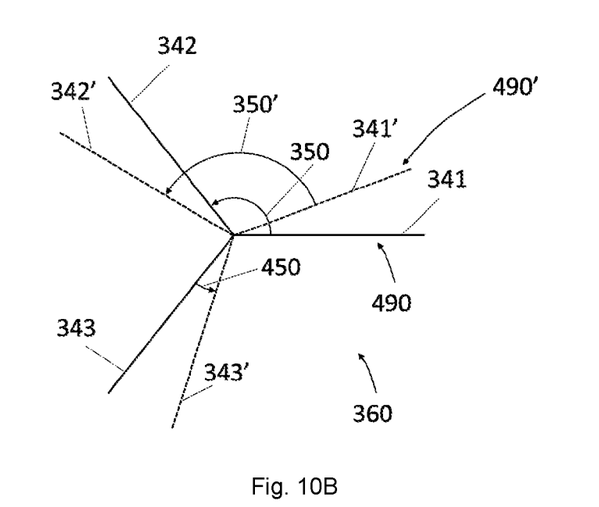
FIG. 10B schematically represents an electrical phase output that the armature of FIG. 10A may provide according to an example.

Each of the output wires 331, 332, 333, 331', 332', 333' may provide an electrical phase 340. In some examples, the electrical phase output may be such that an electrical phase difference 355 is lower than any other electrical phase angles. FIG. 10B may schematically represent an example of such an electrical phase output 360 provided by the armature windings 310 of FIG. 10A. In this example, each group of windings 405, 410 provides a three-electrical phase output 490, 490' with substantially equal phase differences 350, 350'. One of these three-electrical phase output 490, e.g. the electrical phase output provided by group 405, is indicated with continuous lines 341, 342, 343, and the other three-electrical phase output 490', e.g. the electrical phase output provided by group 410, is indicated with short-dash interrupted lines 341', 342', 343'. The two three-electrical phase outputs 490, 490' are separated by an electrical phase difference 450, which in this example is lower than any of the other electrical phase differences. I.e., electrical phase difference 450 is in this example a lowest electrical phase difference 355.

Thus, the switch 320 connecting the output wires in FIG. 10A may be configured to provide an electrical connection 500 between the output wires configured to provide an electrical phase difference 355 lower than the other electrical phase differences. For example, if output wires 331, 332, 333, 331', 332', 333' provide an electrical phase 341, 342, 343, 341', 342', 343' respectively, the first switch 321 may enable an electrical connection 500 between wires 331 and 331', wires 332 and 332', and 333 and 333' as shown in FIG. 10A. Therefore, a number of electrical connections 500 equal to the number of the possible electrical phase differences 355 lower than any of the other electrical phase differences 350 that the armature 300 may be configured to provide may be provided or enabled by the first switch 321.

In some other examples, instead of having one switch 321 for providing all the electrical connections 500 between the output wires of the windings 310, more than one switch 320 may be provided. For example, one switch may be provided for enabling one electrical connection 500. I.e., in one example, three switches 320 may be included in FIG. 10A for providing each of the three connections 500.

Figure 12:
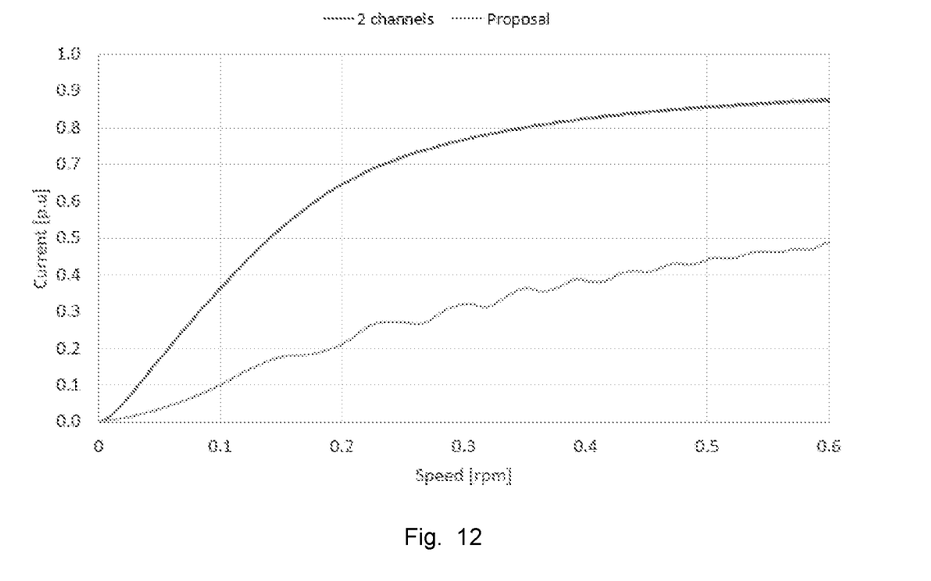
FIG. 12 illustrates an example of short-circuit current that may circulate in the windings of the example of FIG. 10A as a function of rotor speed of rotation and compares it to the short-circuit current of FIG. 4.

FIG. 12 shows an example of a short-circuit current that may circulate through the windings 310 of a six-phase armature 300 such as the one in FIG. 10A when output wires providing a lowest electrical phase have been put into contact, e.g. 331 with 331', 332 with 332' and 333 with 333' (lower curve). This curve is compared to the short-circuit current shown in FIG. 4 for the case where a three-phase armature is short-circuited in its entirety.

Figure 13:
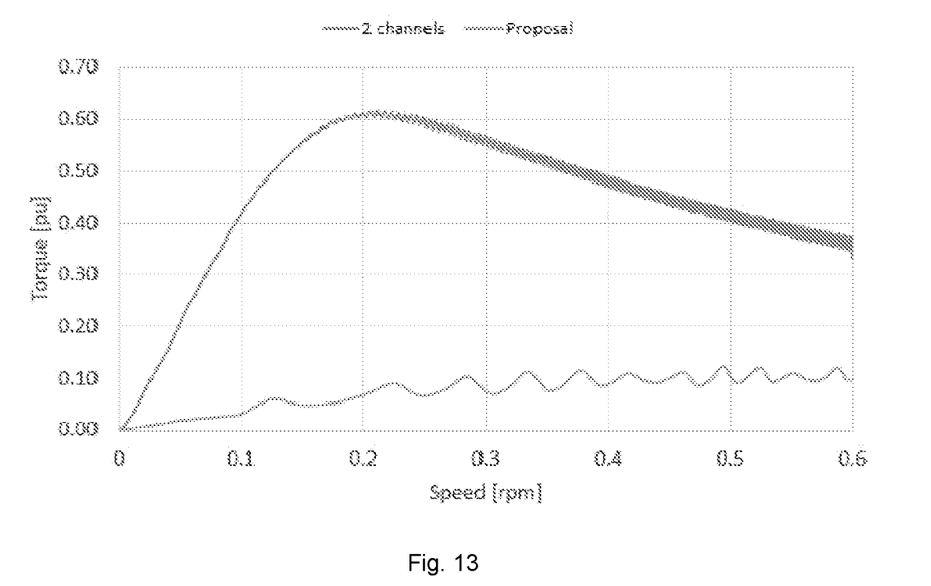
FIG. 13 illustrates the torque as a function of rotor speed that may be necessary to reach the current values shown in FIG. 12.

FIG. 13 shows a graph where torque required for reaching the current depicted in FIG. 12 is plotted as a function of the rotational speed of the rotor (lower curve). This curve is compared to the torque shown in FIG. 4 for the case where a three-phase armature is short-circuited in its entirety. As it can be seen, the necessary torque may be greatly reduced by employing examples disclosed herein. Accordingly, the wind speed around the wind turbine blades 120 which may be necessary to produce such torque values may be less than the one shown in FIG. 6 and the armature with one or more switches 320 and the methods described throughout this disclosure may provide an efficient generator insulation without the need of a power converter at wind speeds where an entire short-circuit of the generator windings 310 may not enable current to be induced.

In general, any step for assembling an armature 300 according to the invention, e.g. according to the explanations regarding FIGS. 8 to 10B, may be incorporated in any of the methods described herein.

An armature 300 according to the invention may be included in a generator 162. Thus, an electrical generator 162, e.g. for a wind turbine 160, comprising an armature 300 as disclosed herein may be provided. In some examples, the generator 162 may be a permanent magnet generator.

In some examples, a generator 162 including an armature 300 according to the invention may be included in a wind turbine 160. Therefore, a wind turbine 160 comprising a wind turbine tower 170, a nacelle 161 on top of the tower 170, a rotor including one or more wind turbine blades 120 mounted to the nacelle 161, and a generator 162 including an armature 300 as described throughout this disclosure inside the nacelle 161 may be provided.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine having a rotor with one or more wind turbine blades and a generator having an armature, wherein the armature has three or more windings and is configured to provide three or more electrical phases, wherein a first winding is configured to provide a first electrical phase and a second winding is configured to provide a second electrical phase, the second electrical phase and the first electrical phase being out of phase, the method comprising:
   short-circuiting less than all of the armature windings by closing a first switch between an output wire of the first winding and an output wire of the second winding; and
   inducing currents in the armature windings by wind acting on the wind turbine blades.

2. The method according to claim 1, wherein the armature provides an electrical phase difference between two of the electrical phases that is lower than another electrical phase difference between a different two of the electrical phases.

3. The method according to claim 2, wherein the first electrical phase and the second electrical phase have an electrical phase difference that is lower than any electrical phase difference between any of the other electrical phases.

4. The method according to claim 1, further comprising circulating short-circuit current through the short-circuited windings.

5. The method according to claim 4, further comprising circulating the short-circuit current for less than three hours.

6. The method according to claim 1, further comprising disabling the passage of current between the output wires which have been short-circuited.

7. The method according to claim 6, further comprising starting operation of the generator.

8. A method for operating a wind turbine having a rotor with one or more wind turbine blades and a generator having an armature, wherein the armature has three or more windings and is configured to provide three or more electrical phases, wherein a first winding is configured to provide a first electrical phase and a second winding is configured to provide a second electrical phase, the second electrical phase and the first electrical phase being out of phase, the method comprising:
   short-circuiting less than all of the armature windings by closing a first switch between an output wire of the first winding and an output wire of the second winding;

inducing currents in the armature windings by wind acting on the wind turbine blades; and wherein the armature has two or more winding groups, each group including a neutral wire, and the method further comprises connecting one or more switches between the neutral wires of each group of windings such that all the neutral wires may be in electrical contact.

9. The method according to claim 8, further comprising electrically connecting a plurality of pairs of the output wires, an electrical phase differences between the electrical phases provided by the pairs of output wires being the same.

10. An armature for a wind turbine generator, the armature comprising:

three or more windings configured to provide three or more electrical phases, wherein a first winding is configured to provide a first electrical phase and a second winding is configured to provide a second electrical phase, the first electrical phase and the second electrical phase being out of phase;

each of the windings comprising an output wire; and a first switch configured to selectively short-circuit less than all of the windings by connecting the output wire of the first winding and the output wire of the second winding.

11. The armature according to claim 10, wherein the first electrical phase and the second electrical phase have an electrical phase difference that is lower than an electrical phase difference between any other of the electrical phases.

12. The armature according to claim 10, wherein the windings are configured as multiple pairs of windings, each of the pairs of windings comprising a respective first switch to provide electrical connections between the output wires of the pair of windings without short-circuiting all of the windings, and wherein the electrical phase difference between all of the different pairs of windings is the same.

13. The armature according to claim 12, wherein the armature is a six-phase armature or a nine-phase armature.

14. An electrical generator for a wind turbine, comprising the armature according to claim 10.

15. A wind turbine, comprising a wind turbine tower; a nacelle on top of the tower; a rotor including one or more wind turbine blades mounted to the nacelle; and the generator according to claim 14.

* * * * *